US007143081B2

(12) United States Patent
Dettinger et al.

(10) Patent No.: US 7,143,081 B2
(45) Date of Patent: Nov. 28, 2006

(54) AUTOMATED ABSTRACT DATABASE GENERATION THROUGH EXISTING APPLICATION STATEMENT ANALYSIS

(75) Inventors: Richard D. Dettinger, Rochester, MN (US); Frederick A. Kulack, Rochester, MN (US); Richard J. Stevens, Mantorville, MN (US); Eric W. Will, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 10/365,297

(22) Filed: Feb. 12, 2003

(65) Prior Publication Data

US 2004/0158556 A1    Aug. 12, 2004

(51) Int. Cl.
*G06F 7/00* (2006.01)
*G06F 17/30* (2006.01)
(52) U.S. Cl. .............................................. 707/2; 707/3
(58) Field of Classification Search .............. 707/1–10, 707/100, 202, 203
See application file for complete search history.

(56) References Cited

U.S. PATENT DOCUMENTS

| | | | |
|---|---|---|---|
| 6,263,341 B1 * | 7/2001 | Smiley .................. | 707/103 R |
| 6,272,488 B1 * | 8/2001 | Chang et al. .................. | 707/4 |
| 6,421,656 B1 * | 7/2002 | Cheng et al. .................. | 707/2 |
| 6,434,568 B1 * | 8/2002 | Bowman-Amuah ..... | 707/103 R |
| 6,539,388 B1 * | 3/2003 | Hattori et al. .............. | 707/101 |
| 6,725,227 B1 | 4/2004 | Li | |
| 6,768,986 B1 * | 7/2004 | Cras et al. ..................... | 707/2 |
| 6,772,137 B1 * | 8/2004 | Hurwood et al. .............. | 707/2 |
| 6,847,974 B1 * | 1/2005 | Wachtel ....................... | 707/101 |
| 6,931,391 B1 * | 8/2005 | Tang et al. .................... | 707/2 |
| 2002/0091702 A1 * | 7/2002 | Mullins ....................... | 707/100 |
| 2004/0148278 A1 * | 7/2004 | Milo et al. ..................... | 707/3 |

* cited by examiner

*Primary Examiner*—Hosain Alam
*Assistant Examiner*—Usmaan Saeed
(74) *Attorney, Agent, or Firm*—Patterson & Sheridan, LLP

(57) ABSTRACT

The present invention generally is directed to methods, articles of manufacture and systems for automatically generating abstract representations of a limited subset of data repository fields accessed by a particular application. The limited subset of fields may be identified by monitoring queries issued against the data repository by the application. The abstract representations may be grouped in a data repository abstraction (DRA) component that serves as a data definition framework allowing data from the fields to be accessed independent of the particular manner in which the data is physically represented in the data repository. By limiting the fields exposed to the application to the limited subset of fields actually accessed by the application, the DRA component, in effect, provides the application with a custom database tailored to its particular needs.

31 Claims, 9 Drawing Sheets

AUTOMATED ABSTRACT DATABASE GENERATION THROUGH EXISTING APPLICATION STATEMENT ANALYSIS

BACKGROUND OF THE INVENTION

1. Field of the Invention

The present invention generally relates to data processing and more particularly to accessing data independent of the particular manner in which the data is physically represented.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

One of the issues faced by data mining and database query applications, in general, is their close relationship with a given database schema (e.g., a relational database schema). This relationship makes it difficult to support an application as changes are made to the corresponding underlying database schema. Further, the migration of the application to alternative underlying data representations is inhibited. In today's environment, the foregoing disadvantages are largely due to the reliance applications have on SQL, which presumes that a relational model is used to represent information being queried. Furthermore, a given SQL query is dependent upon a particular relational schema since specific database tables, columns and relationships are referenced within the SQL query representation. As a result of these limitations, a number of difficulties arise.

One difficulty is that changes in the underlying relational data model require changes to the SQL foundation that the corresponding application is built upon. Therefore, an application designer must either forgo changing the underlying data model to avoid application maintenance or must change the application to reflect changes in the underlying relational model. Another difficulty is that extending an application to work with multiple relational data models requires separate versions of the application to reflect the unique SQL requirements driven by each unique relational schema. Yet another difficulty is evolution of the application to work with alternate data representations because SQL is designed for use with relational systems. Extending the application to support alternative data representations, such as XML, requires rewriting the application's data management layer to use non-SQL data access methods.

A typical approach used to address the foregoing problems is software encapsulation. Software encapsulation involves using a software interface or component to encapsulate access methods to a particular underlying data representation. An example is found in the Enterprise JavaBean (EJB) specification that is a component of the Java 2 Enterprise Edition (J2EE) suite of technologies. In accordance with the EJB specification, entity beans serve to encapsulate a given set of data, exposing a set of Application Program Interfaces (APIs) that can be used to access this information. This is a highly specialized approach requiring the software to be written (in the form of new entity EJBs) whenever a new set of data is to be accessed or when a new pattern of data access is desired. The EJB model also requires a code update, application built and deployment cycle to react to reorganization of the underlying physical data model or to support alternative data representations. EJB programming also requires specialized skills, since more advanced Java programming techniques are involved. Accordingly, the EJB approach and other similar approaches are rather inflexible and costly to maintain for general-purpose query applications accessing an evolving physical data model.

Another shortcoming of the prior art, is the manner in which information can be presented to the user. A number of software solutions support the use of user-defined queries, in which the user is provided with a "query-building" tool to construct a query that meets the user's specific data selection requirements. In an SQL-based system, the user is given a list of underlying database tables and columns to choose from when building the query. The user must decide which tables and columns to access based on the naming convention used by the database administrator, which may be cryptic, at best.

Further, while the number of tables and columns presented to the user may be vast, only a limited subset may actually be of interest. Therefore, nonessential content is revealed to the end user, which may make it difficult to build a desired query, as the nonessential content must be filtered out by the user. In other words, in a conventional data model, a single database schema encompasses all the data for an entity, although individual groups within the entity (teams, workgroups, departments, etc.) are typically only interested in a limited portion of the data. For example, in a medical research facility, a hemotology research group may only be interested in a limited number (e.g., 20–40) of medical tests, while an entity-wide data model may encompass thousands of tests. Accordingly, when building a query, members of the hemotology research group may spend a lot of effort just to filter through the large number of tests for which they have no interest.

Therefore, there is a need for an improved and more flexible method for presenting, to a user, a limited subset of all possible fields to choose from when building a query. Preferably, the limited subset will only include fields of interest to the user.

SUMMARY OF THE INVENTION

The present invention generally provides methods, articles of manufacture and systems for automatically generating abstract representations of fields contained in a data repository based on information collected from queries issued against the data repository. In some embodiments, the abstract representations may be grouped in a data repository abstraction component that serves as a data definition framework allowing data to be accessed from the data repository independent of the particular manner (e.g., SQL, XML, etc.) in which the data is physically represented.

For some embodiments, a method for automatically generating a data repository abstraction component describing, and used to access, data in a data repository generally includes monitoring queries issued against the data repository, collecting usage information from the monitored queries, and generating the data repository abstraction component based on the collected usage information.

For some embodiments, the article of manufacture generally includes a computer-readable medium containing a program which, when executed by a processor, performs operations for automatically generating a data repository abstraction component describing, and used to access, data in a data repository. The operations generally include monitoring queries issued against the data repository, collecting usage information from the monitored queries, and generating the data repository abstraction component based on the collected usage information.

For some embodiments, the system generally includes a data repository, an application suitable for querying the data repository, and a data repository abstraction generator. The data repository abstraction generator is generally configured to generate a data repository abstraction component describing, and used to access, data in the data repository based on usage information collected from monitoring queries issued against the data repository by the application.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
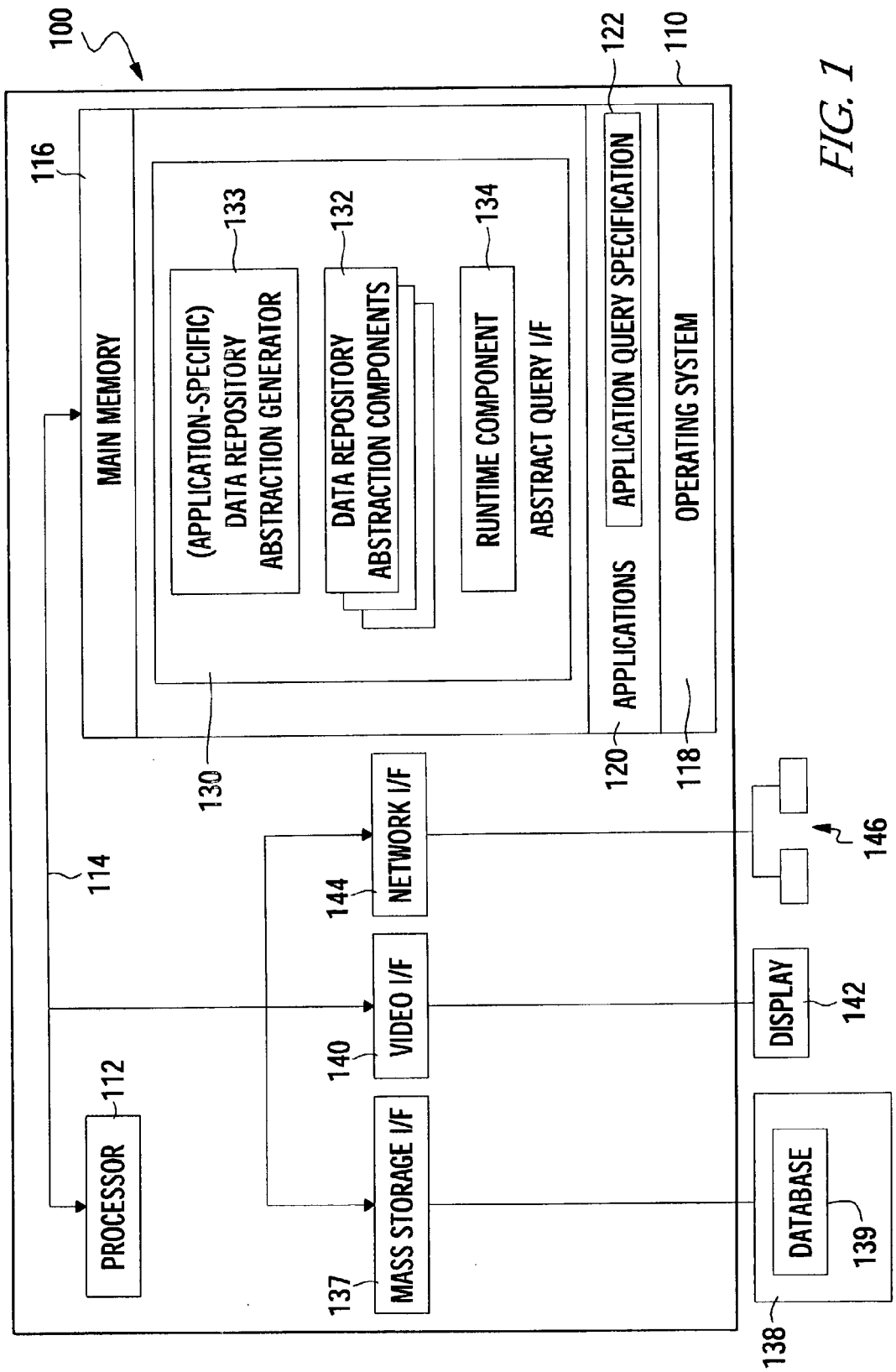
FIG. 1 is a computer system illustratively utilized in accordance with the present invention.

The present invention generally is directed to methods, articles of manufacture and systems for automatically generating abstract representations of a limited subset of data repository fields accessed by a particular application. The limited subset of fields may be identified by monitoring queries issued against the data repository by the application. The abstract representations may be grouped in a data repository abstraction (DRA) component that serves as a data definition framework allowing data from the fields to be accessed independent of the particular manner (e.g., SQL, XML, etc.) in which the data is physically represented in the data repository. By limiting the fields exposed to the application to the limited subset of fields actually accessed by the application, the DRA component, in effect, provides the application with a custom database tailored to its particular needs.

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Referring now to FIG. 1, a computing environment 100 is shown. In general, the distributed environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer iSeries 400 available from International Business Machines of Armonk, N.Y.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 100 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., direct access storage device 138) or on another computer coupled to the computer system 110 via bus 114.

The memory 116 is shown configured with an operating system 118. The operating system 118 is the software used for managing the operation of the computer system 100. Examples of the operating system 118 include IBM OS/400®, UNIX, Microsoft Windows®, and the like.

The memory 116 further includes one or more applications 120 and an abstract query interface 130. The applications 120 and the abstract query interface 130 are software products comprising a plurality of instructions that are resident at various times in various memory and storage devices in the computer system 100. When read and executed by one or more processors 112 in the computer system 100, the applications 120 and the abstract query interface 130 cause the computer system 100 to perform the steps necessary to execute steps or elements embodying the various aspects of the invention. The applications 120 (and more generally, any requesting entity, including the operating system 118) are configured to issue queries against a database 139 (shown in storage 138). The database 139 is representative of any collection of data regardless of the particular physical representation. By way of illustration, the database 139 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

The queries issued by the applications 120 are defined according to an application query specification 122 included with each application 120. The queries issued by the applications 120 may be predefined (i.e., hard coded as part of the applications 120) or may be generated in response to input (e.g., user input). In either case, the queries (referred to herein as "abstract queries") are composed using logical fields defined by the abstract query interface 130. In particular, the logical fields used in the abstract queries are defined (or specified) by one or more DRA components 132 of the abstract query interface 130. Thus, the DRA component 132 may be regarded as a data definition framework, which may be accessed when executing an abstract query against the database 139. For example, the abstract queries may be executed by a runtime component 134 which transforms the abstract queries into a form consistent with the physical representation of the data contained in the database 139, based on the logical field specifications (or definitions) in the DRA component 132.

As previously described, the applications 120 may be used by different groups (departments, workgroups, etc.) within the same entity to query the database 139, although each group may only be interested in a limited portion of data stored on the database 139. Accordingly, in an effort to limit the number of logical fields presented to users of each group, each of the DRA components 132 may include a limited number of logical fields chosen for a particular group. Thus, each DRA component 132 may be considered an application specific DRA component, effectively presenting to each group a database tailored to its own needs.

In an effort to facilitate the transition from a conventional (physical) data model encompassing all data for an entity to an application specific abstract data model, the DRA components 132 may be automatically generated by an application specific DRA generator 133. As will be described in greater detail below, the DRA generator 133 may be generally configured to monitor queries issued against the database 139 by an application 120 for a particular user group. From the monitored queries, the DRA generator 133 may collect information regarding usage of the database 139 by the particular user group. This collected information may then be used to generate DRA components 132 specific to the particular group.

Figure 2A:
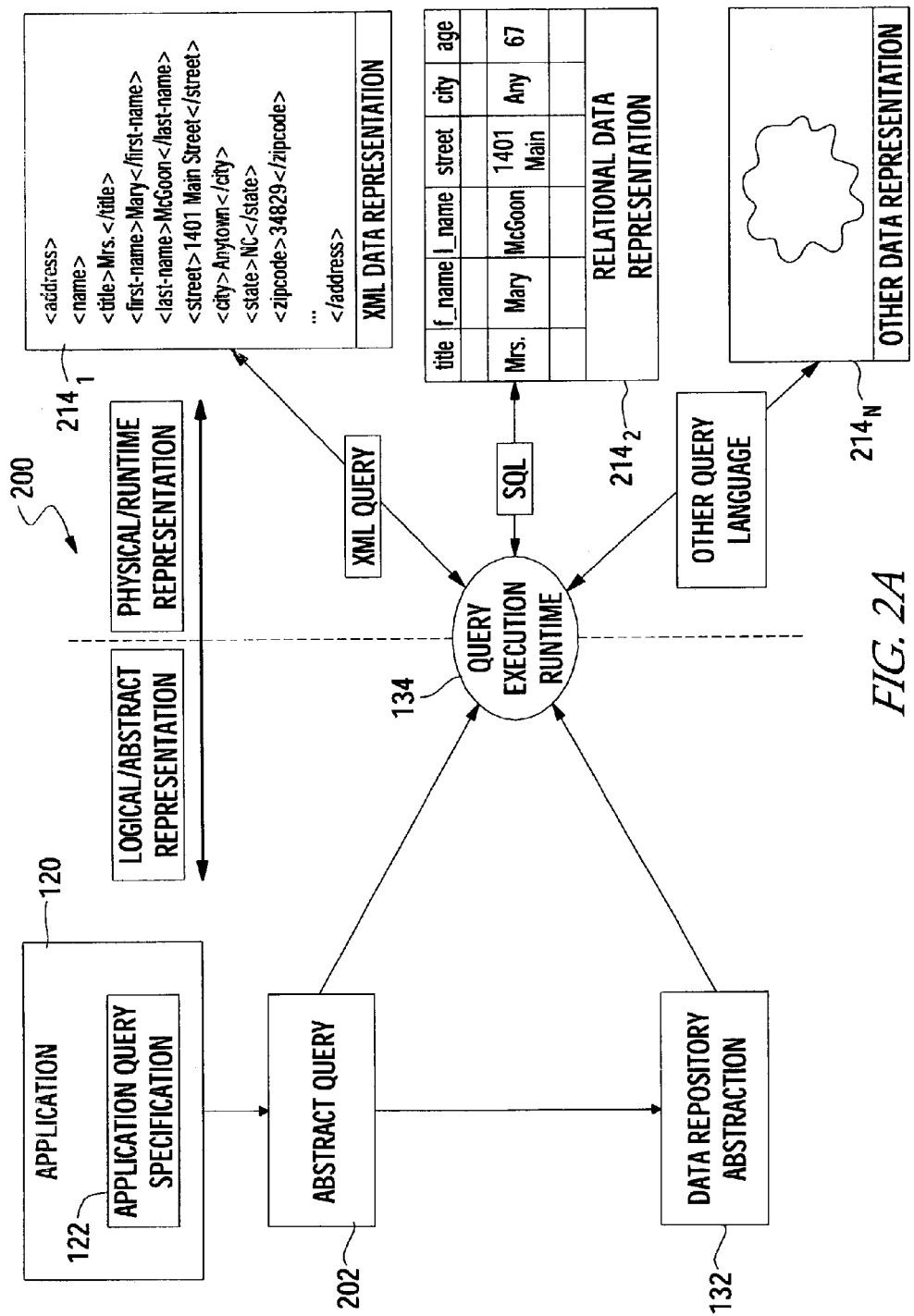
FIG. 2A is a relational view of software components, including a data repository abstraction component, of one embodiment of the present invention.
Figure 2B:
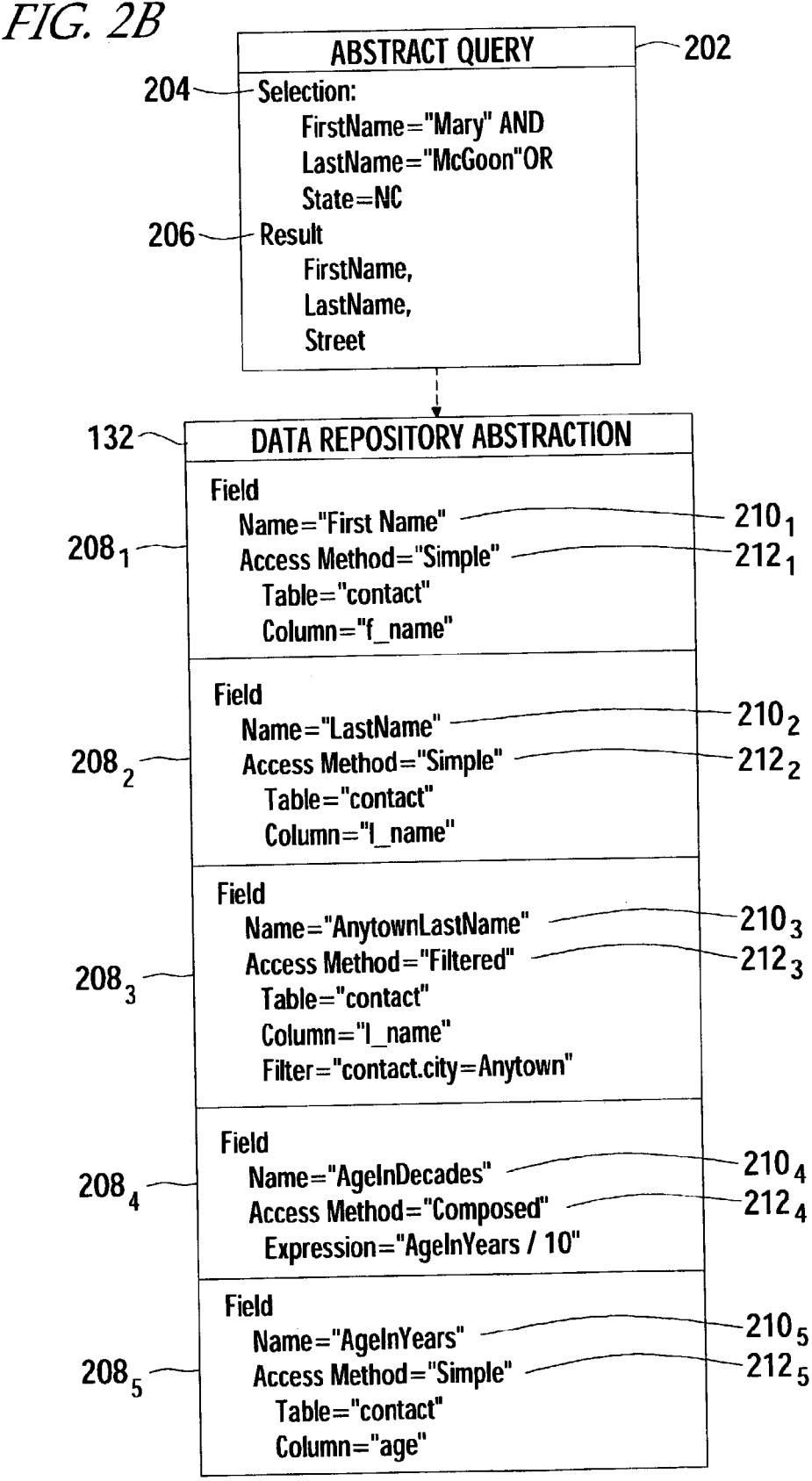
FIGS. 2B illustrates an exemplary abstract query and data repository abstraction component according to one embodiment of the present invention.

Prior to describing the DRA generator 133 however, the application query specification 122 and the abstract query interface 130 are further described with reference to FIGS. 2A–B (collectively referred to herein as FIG. 2), which show an illustrative relational view 200 of components of the invention according to one embodiment To provide a perspective to the following description, the DRA component 132 may be generated using methods of the present invention. Of course, the abstract data model illustrated in the relational view 200 is exemplary of just one type of abstract data model, the transition to which may be facilitated by techniques of the present invention. It will be appreciated by those skilled in the art that the abstract representations of physical fields automatically generated in accordance with the present invention may be utilized in a number of ways.

The requesting entity (e.g., one of the applications 120) issues a query 202 as defined by the respective application query specification 122 of the requesting entity. The resulting query 202 is generally referred to herein as an "abstract query" because the query is composed according to abstract (i.e., logical) fields rather than by direct reference to the underlying physical data entities in the database 139. As a result, abstract queries may be defined that are independent of the particular underlying data representation used. In one embodiment, the application query specification 122 may include both criteria used for data selection (selection criteria 204) and an explicit specification of the fields to be returned (return data specification 206) based on the selection criteria 204.

The logical fields specified by the application query specification 122 and used to compose the abstract query 202 are defined by the DRA component 132. In general, the DRA component 132 exposes information as a set of logical fields that may be used within a query (e.g., the abstract query 202) issued by the application 120 to specify criteria for data selection and specify the form of result data returned from a query operation. The logical fields are defined independently of the underlying data representation being used in the database 139, thereby allowing queries to be formed that are loosely coupled to the underlying data representation.

The logical fields may be defined by abstract representations (referred to hereinafter as logical field specifications) of corresponding fields in the database 139. In general, the DRA component 132 comprises a plurality of logical field specifications $208_1$, $208_2$, $208_3$, $208_4$ and $208_5$ (five shown by way of example), collectively referred to as the field specifications 208. Specifically, a field specification is provided for each logical field available for composition of an abstract query. Each field specification comprises a logical field name $210_1$, $210_2$, $210_3$, $210_4$, $210_5$ (collectively, field name 210) and an associated access method $212_1$, $212_2$, $212_3$, $212_4$, $212_5$ (collectively, access method 212). The access methods associate (i.e., map) the logical field names to a particular physical data representation $214_1$, $214_2$ . . . $214_N$ in a database (e.g., database 139). By way of illustration, two data representations are shown, an XML data representation $214_1$ and a relational data representation $214_2$. However, the physical data representation $214_N$ indicates that any other data representation, known or unknown, is contemplated. In one embodiment, a single DRA component 132 contains field specifications (with associated access methods) for two or more physical data representations 214. In an alternative embodiment, a different single DRA component 132 is provided for each separate physical data representation 214.

Any number of access methods are contemplated depending upon the number of different types of logical fields to be supported. In one embodiment, access methods for simple fields, filtered fields and composed fields are provided. The field specifications $208_1$, $208_2$ and $208_5$ exemplify simple field access methods $212_1$, $212_2$, and $212_5$, respectively. Simple fields are mapped directly to a particular entity in the underlying physical data representation (e.g., a field mapped to a given database table and column). By way of illustration, the simple field access method $212_1$ shown in FIG. 2B maps the logical field name $210_1$ ("FirstName") to a column named "f_name" in a table named "contact". The field specification $208_3$ exemplifies a filtered field access method $212_3$. Filtered fields identify an associated physical entity and provide rules used to define a particular subset of items within the physical data representation. An example is provided in FIG. 2B in which the filtered field access method $212_3$ maps the logical field name $210_3$ ("AnytownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification $208_4$ exemplifies a composed field access method $212_4$. Composed access methods compute a logical field from one or more physical fields using an expression supplied as part of the access method definition. In this way, information which does not exist in the underlying data representation may be computed. In the example illustrated in FIG. 2B the composed field access method $212_3$ maps the logical field name $210_3$ "AgeInDecades" to "AgeInYears/ 10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 208 of the DRA component 132 shown in FIG. 2 are representative of logical fields mapped to data represented in the relational data representation $214_2$. However, other instances of the DRA component 132 map logical fields to other physical data representations, such as XML.

An illustrative abstract query corresponding to the abstract query 202 shown in FIG. 2 is shown in Table I below. By way of illustration, the abstract query 202 is defined using XML. However, any other language may be used to advantage.

TABLE I

QUERY EXAMPLE

```
001    <?xml version="1.0"?>
002    <!--Query string representation: (FirstName =
       "Mary" AND LastName =
003    "McGoon") OR State = "NC"-->
004    <QueryAbstraction>
005       <Selection>
006          <Condition internalID="4">
007             <Condition field="FirstName" operator="EQ"
                value="Mary"
008    internalID="1"/>
009             <Condition field="LastName" operator="EQ"
                value="McGoon"
010    internalID="3" relOperator="AND"></Condition>
011          </Condition>
012          <Condition field="State" operator="EQ" value=
             "NC" internalID="2"
013    relOperator="OR"></Condition>
014       </Selection>
015       <Results>
016          <Field name="FirstName"/>
```

TABLE I-continued

QUERY EXAMPLE

| | |
|---|---|
| 017 | <Field name="LastName"/> |
| 018 | <Field name="State"/> |
| 019 | </Results> |
| 020 | </QueryAbstraction> |

Illustratively, the abstract query shown in Table I includes a selection specification (lines 005–014) containing selection criteria and a results specification (lines 015–019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative DRA representation corresponding to the DRA 132 shown in FIG. 2 is shown in Table II below. By way of illustration, the DRA representation shown below is defined using XML. However, any other language may be used to advantage.

TABLE II

DATA REPOSITORY ABSTRACTION EXAMPLE

| | |
|---|---|
| 001 | <?xml version="1.0"?> |
| 002 | <DataRepository> |
| 003 |   <Category name="Demographic"> |
| 004 |     <Field queryable="Yes" name="FirstName" displayable="Yes"> |
| 005 |       <AccessMethod> |
| 006 |         <Simple columnName="f_name" tableName="contact"></Simple> |
| 007 |       </AccessMethod> |
| 008 |       <Type baseType="char"></Type> |
| 009 |     </Field> |
| 010 |     <Field queryable="Yes" name="LastName" displayable="Yes"> |
| 011 |       <AccessMethod> |
| 012 |         <Simple columnName="l_name" tableName="contact"></Simple> |
| 013 |       </AccessMethod> |
| 014 |       <Type baseType="char"></Type> |
| 015 |     </Field> |
| 016 |     <Field queryable="Yes" name="State" displayable="Yes"> |
| 017 |       <AccessMethod> |
| 018 |         <Simple columnName="state" tableName="contact"></Simple> |
| 019 |       </AccessMethod> |
| 020 |       <Type baseType="char"></Type> |
| 021 |     </Field> |
| 022 |   </Category> |
| 023 | </DataRepository> |

Application Specific Data Repository Abstraction Generation

Figure 3A:
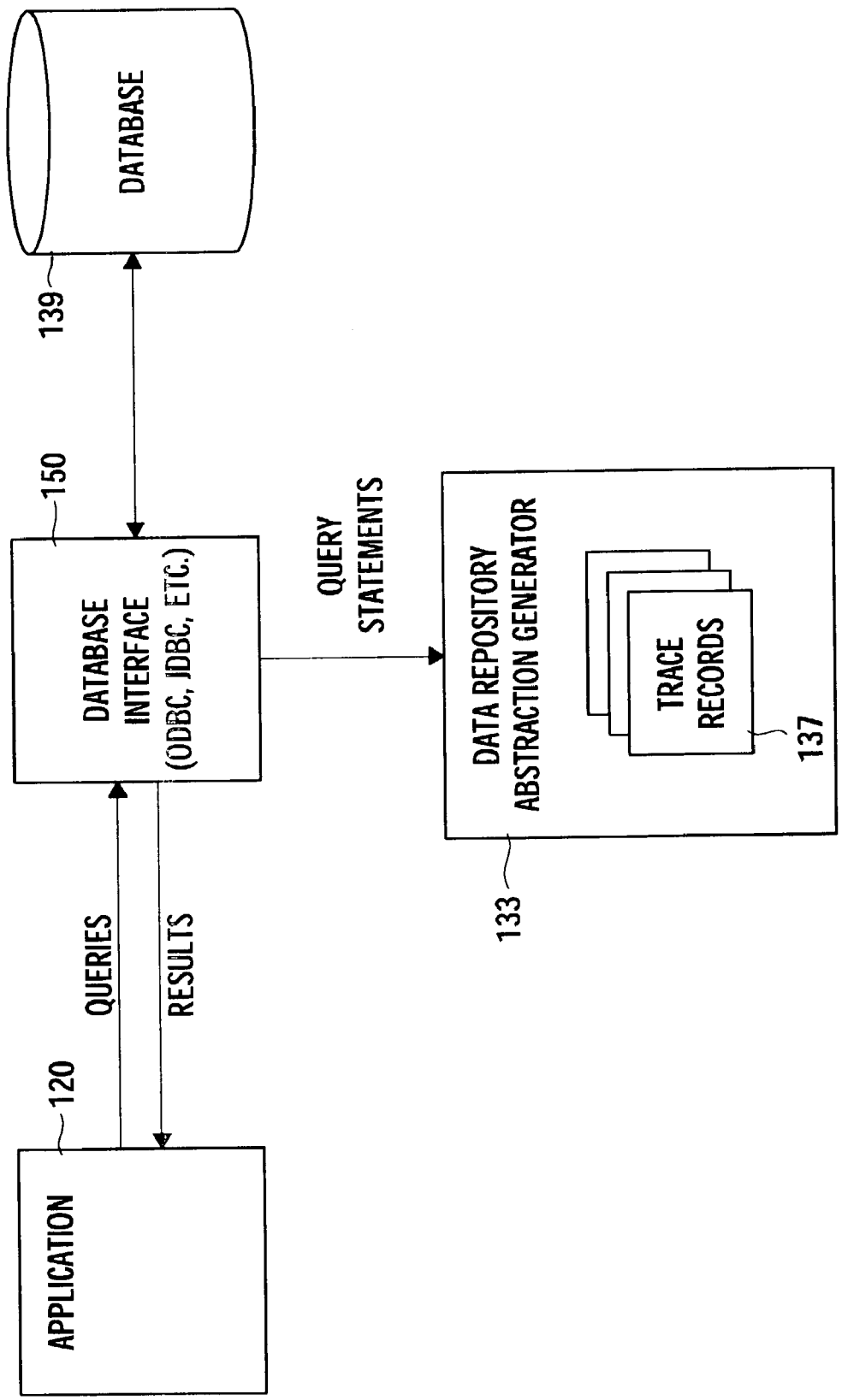
FIGS. 3A and 3B are relational views of software components, including a data repository abstraction generator, of one embodiment of the present invention.
Figure 3B:
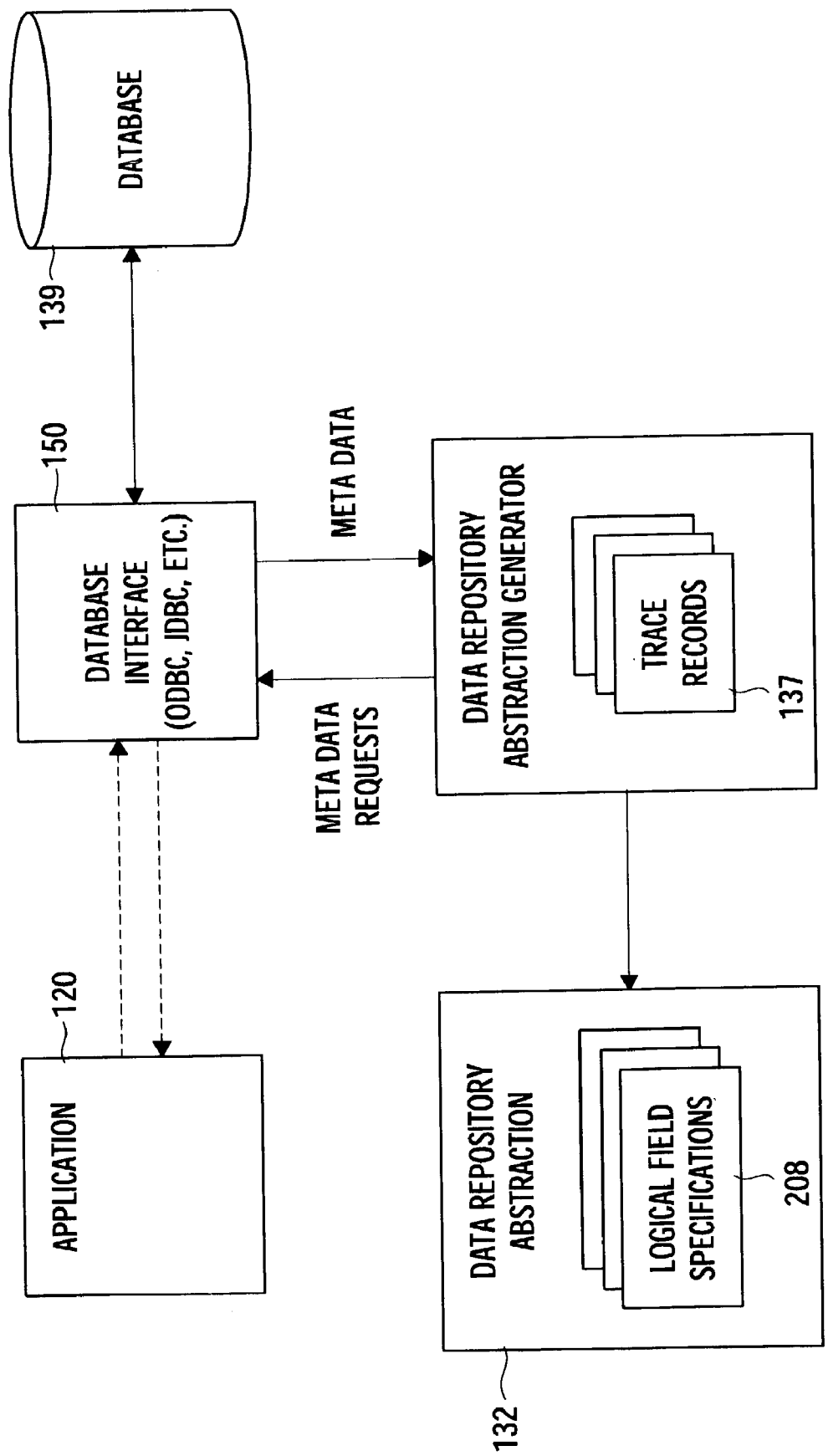

As previously described, in an effort to facilitate the transition from a conventional (i.e., all encompassing physical) data model to an application specific abstract data model, the DRA components 132 may be automatically generated by the DRA generator 133. FIGS. 3A and 3B are relational views that illustrate how the DRA generator 133 may generate a DRA component 132 based on usage information collected from monitoring queries issued against the database 139 by an application 120 configured to query the database 139 in a conventional (non-abstract) manner. While the database 139 may have any of the physical data representations described above, the following description will, at times, refer to certain characteristics of the database 139 that may be specific to a relational data representation (e.g., $214_2$ of FIG. 2A). Such references are intended to facilitate understanding and are not intended to limit the database 139 to any particular physical data representation.

Figure 4:
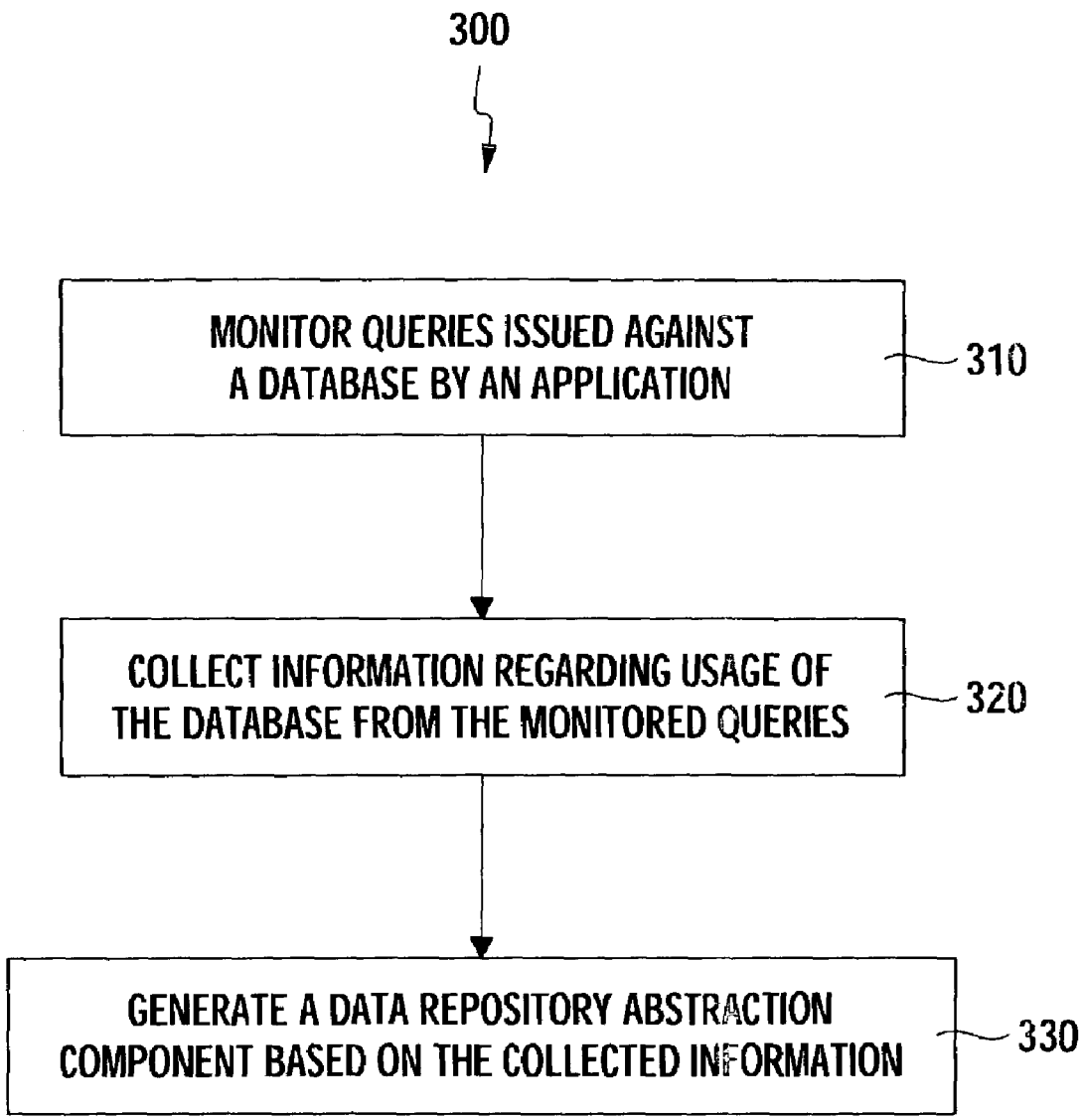
FIG. 4 is a flow chart illustrating exemplary operations for generating a data repository abstraction component according to aspects of the present invention.

Operation of one embodiment of the DRA generator 133 may be described with reference to FIG. 4, which is a flow diagram illustrating exemplary operations 300 for automatically generating the DRA component 132 based on existing query statement analysis, and with reference to FIGS. 5–6 which illustrate exemplary operations for collecting usage information from query statements captured as trace records.

The operations 300 begin at step 310, by monitoring queries issued against a database by an application. The queries may be monitored for any period of time, for example, determined to provide an adequate representation of database usage by the application. As illustrated, the query statements may be monitored via a database interface 150, which represents any suitable software tools capable of monitoring transactions (i.e., queries and results) between the application 120 and the database 139. Examples of suitable interfaces include the Query Monitor software tool available with the iSeries line of servers from IBM. Other suitable interfaces include common call level interfaces, such as the Open Database Connectivity (ODBC) and Java Database Connectivity (JDBC™) call level interfaces. Such interfaces can typically be designed to have trace modes which, when enabled, allow query statements between the application 120 and the database 139 to be captured. The captured query statements may be contained in one or more trace records 137.

At step 320, the DRA generator 133 collects information regarding usage of the database from the monitored queries. Some information may be collected by examining the captured query statements themselves. For illustration, an example of a trace record is shown in TABLE III. As shown, the trace record will typically include the query (lines 001–002) and results (line 003). The mere fact that the field EMP_ID

TABLE III

TRACE RECORD EXAMPLE

| | |
|---|---|
| 001 | Jdbc: 000000e8: SQLExecDirect(3, SELECT EMP_ID AS "EMPLOYEE ID" |
| 002 | FROM EMPTABLE, −3) |
| 003 | 000000e8: RETURN: SQLExecDirect rc is 0) |
| 004 | ------------------------------------------------------------ | in included in the query indicates that this field is, at least occasionally, accessed by the application and should, therefore, be considered for inclusion as a logical field in the generated DRA component. Additionally, use of the EMP_ID field in the select clause indicates the EMP_ID field should be a searchable field. Further, the use of "EMPLOYEE ID" in the as portion of the select clause indicates this may be a suitable logical name for the logical field. While not present in this example, join conditions in captured query statements may also be used to generate a relational section of a DRA component 132.

At step 330, the DRA generator 133 generates the DRA component 132 based on the collected information. For example, based on information collected from the example trace record above, the DRA component may have a logical field specification 208 for the EMP_ID field. The logical field specification 208 may define the logical field to have a name "EMPLOYEE ID" and to be searchable. On the other hand, fields that are not used in queries (i.e., fields that do not show up in query statements captured as trace records 137) may be excluded from the generated DRA component.

The number of trace records 137 required to get an adequate representation of database usage for a particular application may vary. Regardless, the trace records 137 may be parsed to extract the query statements contained therein. The extracted query statements may then be prepared with the database and information in the form of metadata may be collected about the parameters and ResultSets that the extracted query statements would generate.

Figure 5:
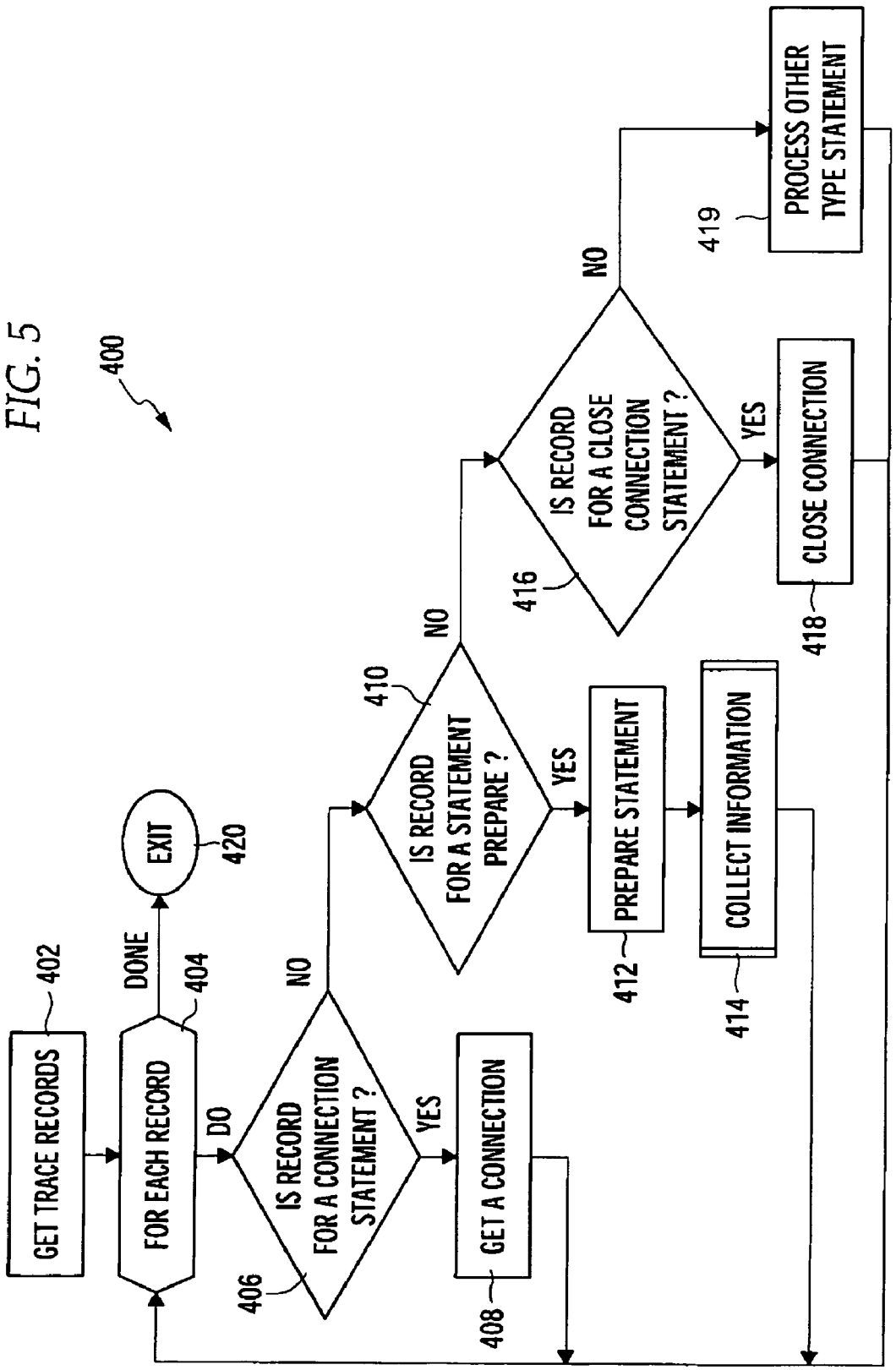
FIG. 5 is a flow chart illustrating exemplary operations for parsing trace records according to aspects of the present invention.

FIG. 5 is a flow chart illustrating exemplary operations 400 for parsing trace records 137 according to aspects of the present invention. The operations 400 begin at step 402, by getting the trace records 137, for example, after allowing the application 120 to run for a predetermined period of time or after capturing a predetermined number of query statements. At step 404, a loop of operations to be performed for each record is entered.

At step 406, a determination is made as to whether a selected record is for a connection statement. If the selected record is for a connection statement, a connection is made at step 408 and operation proceeds to step 404 to select the next record. The connection may be made, for example, with a JDBC connection statement using information from the statement.

If the selected record is not for a connection statement, a determination is made, at step 410, as to whether the selected record is for a statement prepare. In general, preparing a statement includes, among other things, parsing the statement (initially in the form of a text string) and checking the statement for syntax errors prior to execution. If the selected record is for a statement prepare, the statement is prepared, at step 412, and information is collected at step 414. FIG. 6 illustrates exemplary operations for collecting information from a statement.

If the selected record is not for a connection statement or a prepare statement, a determination is made, at step 416, as to whether the selected record is for a close connection statement. If the selected record is for a close connection statement, the connection is closed, at step 418, prior to returning to step 404 to select the next record. If the selected record is for a type of statement other than a close connection statement, the other type of statement is processed, at step 419 (which represents any operations necessary to process the other type statement), prior to returning to step 404 to select the next record. Examples of other types of statements include fetch statements (i.e., to get the next row of data in query results) and various get statements (e.g., getString, getInt, getFloat, etc.). These types of statements may not contain any specific references to fields of the data repository and may, therefore, be less interesting in generating the DRA component 132. Accordingly, for some embodiments, these statements may not be logged, for example, by configuring the trace mode to not capture these types of statements. Regardless, once each trace record has been processed, the operations 400 are exited at step 420.

Figure 6:
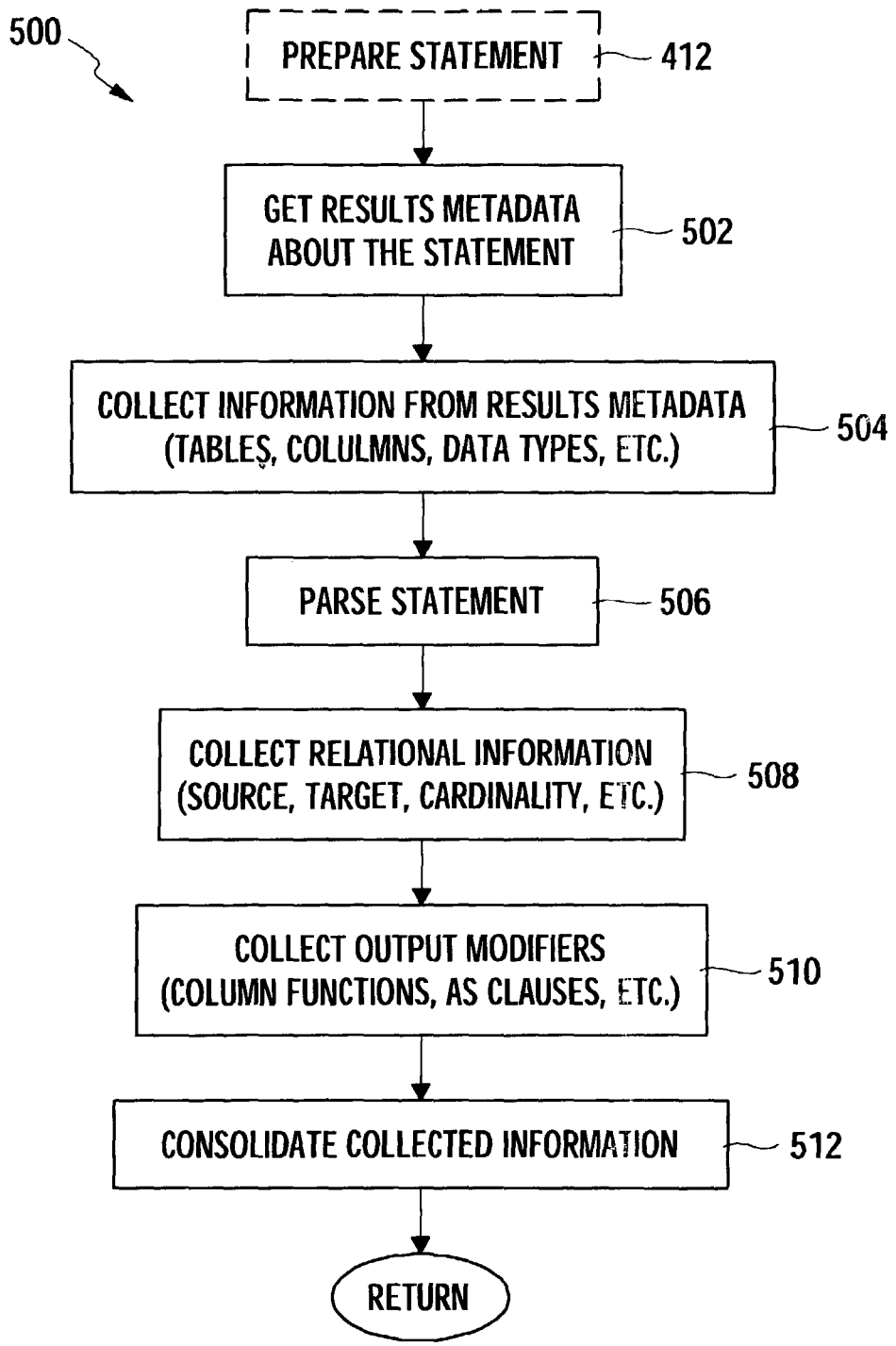
FIG. 6 is a flow chart illustrating exemplary operations for collecting usage information from query statements according to aspects of the present invention.

FIG. 6 is a flow chart illustrating exemplary operations 500 for collecting usage information from captured query statements according to aspects of the present invention. As previously described, while certain information (use of a column or table, a logical name to be used for an abstract logical field, etc.) may be collected from a captured query statement itself, a great deal of additional information may be obtained by collecting metadata about the parameters and results (e.g., ResultSets) the statements would generated.

Therefore, at step 502, the DRA generator 133 gets results metadata about the statement. The metadata may be obtained, for example, through the ResultSetMetaData interface of JDBC. In general, the ResultSetMetaData may be used to find out about the types and properties of the columns in a ResultSet. In other words, the ResultSetMetaData can be used to examine what kind of information was returned by a query.

At step 504, the DRA generator 133 collects information from the results metadata. For example, the information collected from the results metadata may include a list of tables and columns from which results data may be returned along with a list of corresponding data types. This information may also be used to perform mapping (e.g., to determine proper access methods) within the generated DRA component 132, for example, if the data type of results is different form the data type of the physical column. This type of information may be collected, for example, with getTables( ) and/or getColumns( ) methods.

Once the information from the metadata is collected, the statement may be parsed to collect information from the statement itself. At step 506, the statement is parsed. At step 508, relational information is collected from the parsed statement. The collected relational information may include source columns, target columns, cardinality, and other type information indicative of relationships between columns. For example, position of a column within a query statement may provide information, such as whether the column is often searched, whether data from the column is returned as results, or whether the column is only referenced as join criteria.

The relational information may be collected by examining individual clauses contained in the statement. For example, the where clause of a query, such as "select patientId, testvalue from demog_table, diag_table where demog_table.patientId=diag_table.patientId" relates patient ID fields from two separate tables (demog_table and diag_table). In other words, the where clause indicates that the application (at least occasionally) accesses two columns (one in each table), both called patientId, which forms a relationship between the two tables. Accordingly, these two columns should be included in the generated DRA component 132 in order to be able to link the two tables to each other. This information may be used, along with information from the DatabaseMetaData for the two columns, to determine the relationships between the two columns for generation of the DRA component. For example, if one of the columns is defined as 'unique' or is called out as a primary key, that column is the "one" side of a "one-to-many" relationship. If both columns are defined as unique or called out as primary keys, the relationship may be "one-to-one." This information allows the building of a relations section of the DRA component 132.

At step 510, output modifiers of the parsed statement are collected. The output modifiers may include column functions and AS clauses. The collected output modifiers may be used to determine modifying functions to include in the logical field specifications 208, for example, within defined access methods. As previously described, composed access methods may be defined to compute a logical field from one or more physical fields using an expression supplied as part of the access method definition. Accordingly, the DRA generator 133 may be configured to automatically generate composed access methods based on collected output modifiers.

At step 512, the DRA generator 133 consolidates the collected information. Consolidating the information may include removing redundant entries. For example, multiple statements (from previously processed records) may access the same column, leading to collection of the same information multiple times. However, only one corresponding logical field specification 208 would need to be included in the generated DRA component 132. As an alternative to consolidating information after processing each record, information may be consolidated after processing all the records (e.g., prior to exiting the operations 400 of FIG. 5, rather than within the operations 500).

Multiple Application Specific DRA Components

Once the information is collected for each trace record, the DRA generator 133 generates the DRA component 132 including logical field specifications 208 corresponding to fields actually used by the application 120, as indicated by the collected information. As previously described, the database 139 may represent an entity-wide data repository that is queried by different groups within the same entity. In other words, the application 120 of FIGS. 3A and 3B may be representative of just one of many applications, each used by a different group within the same entity, to issue queries against the database 139. For the previously described reasons, it may be beneficial to generate multiple DRA components 132, each containing a set of logical field specifications specific to a corresponding one of the different groups. This may be readily achieved by running the DRA generator 133 (or several instances of the DRA generator 133) in conjunction with applications from each of the different groups. In other words, by monitoring queries issued against the data repository by each application, the DRA generator 133 would generate a unique DRA component 132 for each application.

Figure 7:
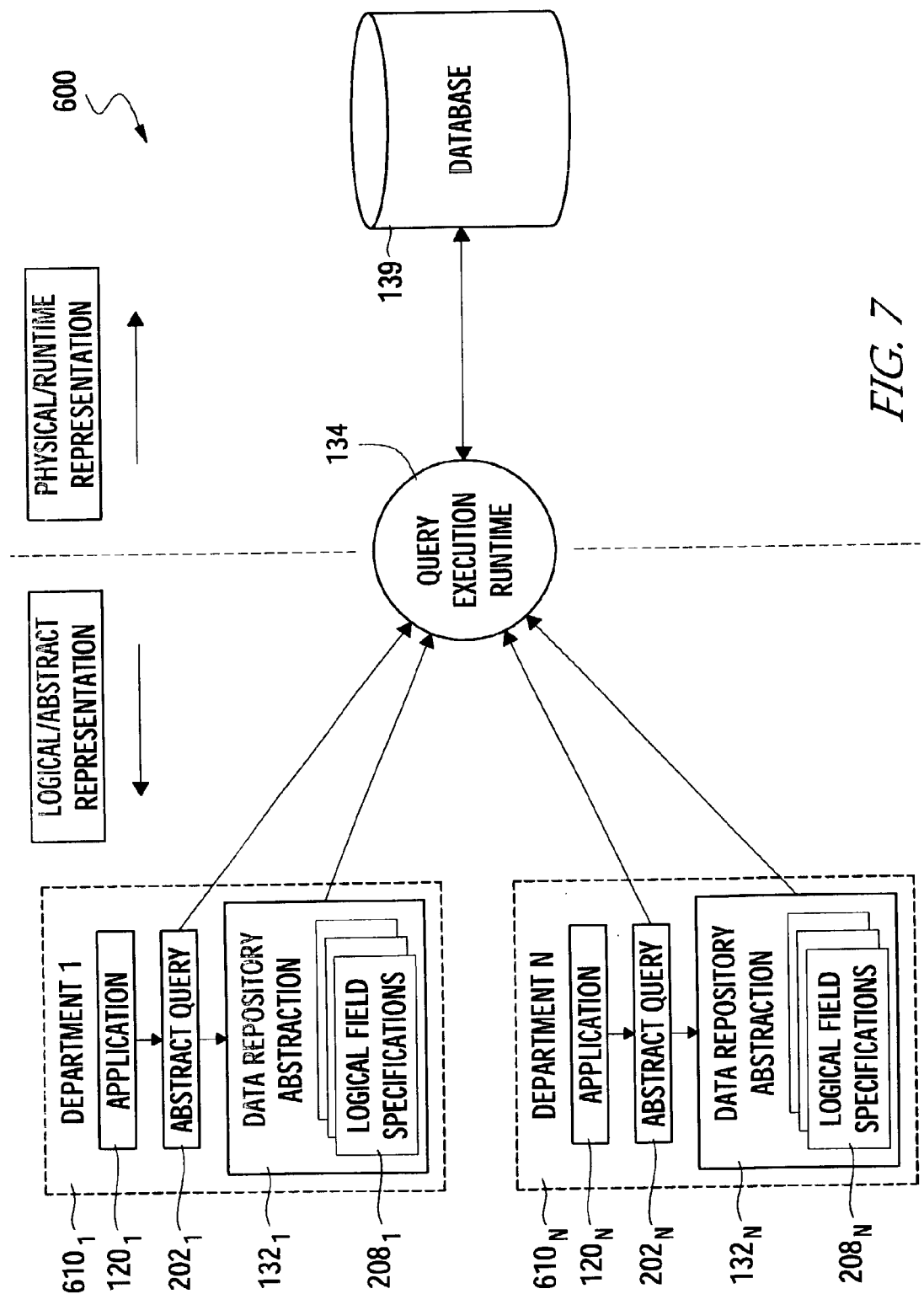
FIG. 7 is a relational view of software components, including multiple data repository abstraction components, of one embodiment of the present invention.

Thus, as illustrated in FIG. 7, for some embodiments, the DRA generator 133 (or different DRA generators 133) may be run to generate multiple application specific DRA components $132_{1 \ldots N}$, each corresponding to a different group $610_{1 \ldots N}$ (illustratively labeled as departments) within the entity. Subsequently, users in group $610_1$ issuing an abstract query $202_1$ against the entity-wide database 139 with the application $120_1$ will be presented with a first set of logical fields defined by logical field specifications $208_1$ within a DRA component $132_1$, while users in group $610_N$ may be presented with a different set of logical fields defined by a second set of logical field specifications $208_N$ within a DRA component $132_N$.

The DRA components $132_{1 \ldots N}$ may be generated, using the techniques described above, based on usage information collected from monitored query transactions between the applications $120_{1 \ldots N}$ and the database 139. By limiting the logical fields presented to each group $610_{1 \ldots N}$ to only those fields of interest, each DRA component $132_{1 \ldots N}$ in effect provides each group $610_{1 \ldots N}$ with a customized database tailored to its particular needs.

CONCLUSION

A data repository abstraction (DRA) component may include logical field specifications that map abstract logical fields to corresponding fields of data having a particular physical representation. The DRA component may be automatically generated from usage information collected by monitoring transactions between an application and a data repository, such as an entity-wide database. A DRA component containing a limited number of logical field specifications chosen based on the collected usage information may then be generated. For some embodiments, separate DRA components may be generated for different groups within an entity by monitoring transactions between applications used by the groups and the database, effectively providing a unique database for each group.

While the foregoing is directed to embodiments of the present invention, other and further embodiments of the invention may be devised without departing from the basic scope thereof, and the scope thereof is determined by the claims that follow.

What is claimed is:

1. A computer implemented method for automatically generating a data repository abstraction component describing, and used to access, data in a data repository, the method comprising:
   monitoring queries issued against the data repository by an application;
   collecting, from the monitored queries, information regarding usage of fields of the data repository;
   identifying, from the collected usage information, a limited subset of one or more fields of the data repository accessed by the application; and
   generating, for use in the data repository abstraction component, abstract representations for the limited subset of fields; wherein the abstract representations logically model the respective limited subset of fields; whereby the data repository abstraction component is customized on the basis of usage of the fields of the data repository; wherein the generated abstract representations model the respective fields of the limited subset of fields and expose the data to users in a manner that allows the users to compose queries on the basis of the generated abstract representations without knowledge of or regard for a particular schema of the data repository; wherein each of the abstract representations comprises:
      a logical field definition comprising a logical field name;
      at least one location attribute identifying a location of data in the data repository corresponding to the logical field name; and
      a reference to an access method invoked to access the data in response to receiving an abstract query containing the logical field name.

2. The method of claim 1, wherein identifying the limited subset of fields comprises extracting, from the monitored queries, a list of one or more referenced fields.

3. The method of claim 2, further comprising determining, based on the monitored queries, whether one or more of the referenced fields is a searchable field.

4. The method of claim 2, further comprising determining, based on the monitored queries, whether one or more of the referenced fields is returned as query results.

5. The method of claim 2, further comprising determining, from the monitored queries, a logical name for the at least one referenced field to be included in a corresponding abstract representation.

6. The method of claim 2, further extracting Information regarding a relationship between at least two referenced fields.

7. The method of claim 1, wherein monitoring the queries comprises examining an output modifier used in a monitored query.

8. The method of claim 1, further comprising gathering metadata for results returned for the monitored queries.

9. The method of claim 8, further comprising obtaining, from the metadata, a list of fields returned as query results.

10. The method of claim 9, wherein generating the abstract representations comprises generating an abstract representation for at least one of the fields returned as query results.

11. A computer implemented method for automatically generating abstract representations of one or more fields of a data source, the method comprising:
    monitoring queries issued against the data source;
    collecting, from the monitored queries, information regarding usage of the fields of the data source; and
    based on the collected usage information, generating the abstract representations for select fields of the data source, wherein the generated abstract representations model the respective select fields and expose the data to users in a manner that allows the users to compose queries on the basis of the generated abstract representations without knowledge of or regard fur a particular schema of the data source; wherein each of the abstract representations comprises a logical field definition comprising a logical field name, at least one location attribute identifying a location of physical data corresponding to the logical field name, and a reference to an access method invoked to access the physical data from the data source in response to receiving an abstract query containing the logical field name.

12. The method of claim 11, wherein collecting information regarding usage of the fields comprises extracting a list of one or more fields of the data source referenced by the monitored queries.

13. The method of claim 12, wherein generating the abstract representations comprises generating an abstract representation for at least one of the fields referenced by the monitored queries.

14. The method of claim 13, wherein the abstract representation for the at least one field comprises an indication of a data type for the at least one field, the data type determined from the collected information regarding usage of the fields.

15. The method of claim 12, further comprising, determining a relationship between at least two of the fields referenced by the monitored queries, based on the collected information regarding usage of the fields.

16. The method of claim 11, wherein at least one of the abstract representations comprises a logical name for a corresponding field of the data source, the logical name determined from the collected information regarding usage of the fields.

17. A tangible computer readable storage medium containing a program which, when executed, performs operations for automatically generating a data repository abstraction component describing, and used to access, data in a data repository, the operations comprising:
    monitoring queries issued against the data repository;
    collecting usage information from the monitored queries, the usage information pertaining to how the fields of the data source are being used; and
    generating, based on the collected usage information, a set of logical field specifications for a limited subset of one or more fields of the data repository accessed by the monitored queries for use in the data repository abstraction component; wherein the generated logical field specifications model the respective select fields and expose the data to users in a manner that allows the users to compose abstract queries on the basis of the data repository abstraction component without knowledge of or regard for a particular schema of the data repository; wherein each of the logical field specifications comprises a logical field definition comprising a logical field name, at least one location attribute identifying a location of physical data corresponding to the logical field name, and a reference to an access method invoked to access the physical data from the data source in response to receiving an abstract query containing the logical field name.

18. The tangible computer readable storage medium of claim 17, wherein collecting usage information from the monitored queries comprises extracting a list of fields referenced by the monitored queries.

19. The tangible computer readable storage medium of claim 18, wherein the operations further comprise determining, based on the collected usage information, whether at least one of the referenced fields is a searchable field.

20. The tangible computer readable storage medium of claim 18, wherein the operations further comprise determining, from the collected usage information, a logical name for at least one of the referenced fields to be included in a corresponding logical field specification.

21. The tangible computer readable storage medium of claim 17, wherein:
    the data repository is a relational database;
    collecting usage information comprises extracting a list of tables and corresponding columns referenced by the monitored queries; and
    generating the set of logical field specifications comprises generating a logical field specification for at least one of the referenced columns.

22. The tangible computer readable storage medium of claim 17, wherein collecting usage information comprises gathering metadata for results returned for the monitored queries.

23. The tangible computer readable storage medium of claim 22, wherein collecting usage information comprises obtaining, from the metadata, a list of fields returned as results.

24. The tangible computer readable storage medium of claim 23, wherein generating the logical field specifications comprises generating a logical field specification for at least one of the fields returned as results.

25. A data processing system, comprising:
    a processor;
    a data repository containing data;
    an application suitable for querying the data repository; and
    a data repository abstraction generator configured to generate a data repository abstraction component describing, and used to access, data in the data repository based on usage information collected by monitoring and parsing queries issued against the data repository by the application; wherein the data repository abstraction generator is configured to generate a plurality of logical field specifications for a limited subset of fields of the data repository accessed by the application, as indicated by the monitored queries; whereby the data repository abstraction is customized on the basis of how the application queries the data repository; wherein the generated logical field specifications model the respective fields of the limited subset of fields and expose the physical data to users in a manner that allows the users to compose queries on the basis of the generated logical field specifications without knowledge of or regard for a particular schema of the data repository; wherein each of the logical field specifications comprises:

a logical field definition comprising a logical field name;

at least one location attribute identifying a location of data in the data repository corresponding to the logical field name; and a reference to an access method invoked to access the data in response to receiving an abstract query containing the logical field name.

26. The data processing system of claim 25, wherein the data repository abstraction generator is configured to determine a logical name, to include in one or more of the generated logical field specifications, based on reference to one or more corresponding fields in the data repository in the monitored queries.

27. The data processing system of claim 25, wherein the data repository comprises a relational database and the data repository generator is configured to extract a list of referenced tables and associated columns from the monitored queries and generate logical field specifications for at least one of the columns.

28. The data processing system of claim 25, wherein the collected usage information comprises output modifiers within the modified queries.

29. The data processing system of claim 25, wherein the data repository abstraction generator is configured to gather metadata for results returned for the monitored queries.

30. The data processing system of claim 29, wherein the data repository abstraction generator is further configured to obtain, from the metadata, a list of fields and associated data types returned as results for the monitored queries.

31. The data processing system of claim 30, wherein the data repository abstraction generator is configured to generate a logical field specification including the associated data type for one or more of the fields returned as results for the monitored queries.

* * * * *